US009774583B2

(12) United States Patent
Venkatesan et al.

(10) Patent No.: US 9,774,583 B2
(45) Date of Patent: Sep. 26, 2017

(54) PROVIDING SECURE SEAMLESS ACCESS TO ENTERPRISE DEVICES

(71) Applicant: Intel IP Corporation, Santa Clara, CA (US)

(72) Inventors: Ganesh Venkatesan, Hillsboro, OR (US); Carlos Cordeiro, Portland, OR (US); Emily H. Qi, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 88 days.

(21) Appl. No.: 14/317,264

(22) Filed: Jun. 27, 2014

(65) Prior Publication Data

US 2015/0381594 A1 Dec. 31, 2015

(51) Int. Cl.
G06F 7/04 (2006.01)
G06F 15/16 (2006.01)
G06F 17/30 (2006.01)
H04L 29/06 (2006.01)
H04W 12/06 (2009.01)
H04W 84/18 (2009.01)

(52) U.S. Cl.
CPC ........ *H04L 63/08* (2013.01); *G06F 17/30876* (2013.01); *H04W 12/06* (2013.01); *H04W 84/18* (2013.01)

(58) Field of Classification Search
CPC ....... H04L 63/08; H04L 63/083; H04L 63/10; G06F 21/45; G06F 21/31
USPC .......................................................... 726/6
See application file for complete search history.

(56) References Cited

U.S. PATENT DOCUMENTS

| 2010/0063932 | A1* | 3/2010 | Camenisch ........ G06Q 20/3821 705/76 |
| 2011/0302646 | A1* | 12/2011 | Ronda .................. H04L 9/3213 726/9 |
| 2012/0102554 | A1 | 4/2012 | Emerick et al. |
| 2012/0232917 | A1* | 9/2012 | Al-Khudairy .......... G06Q 10/02 705/2 |
| 2013/0059603 | A1* | 3/2013 | Guenec .................. G06Q 10/02 455/456.2 |
| 2013/0212653 | A1 | 8/2013 | Hoghaug |
| 2013/0346995 | A1 | 12/2013 | Jackson |
| 2013/0347073 | A1 | 12/2013 | Bryksa et al. |
| 2014/0181992 | A1 | 6/2014 | Janson et al. |

OTHER PUBLICATIONS

Wikipedia.org, "Wi-Fi Protected Setup," downloaded Jun. 19, 2014, 4 pages.

(Continued)

*Primary Examiner* — Kambiz Zand
*Assistant Examiner* — Stephen Sanders
(74) *Attorney, Agent, or Firm* — Trop, Pruner & Hu, P.C.

(57) ABSTRACT

In an embodiment, a system includes at least one processor having at least one core including a reservation control logic to receive a request from a user device for access at a future time to an enterprise device. The reservation control logic may grant a reservation to the user device to enable the access and schedule delivery of an authentication message to the user device including a credential to enable the user device to set up an ad hoc wireless connection with the enterprise device at the future time, without involvement of a user of the user device. Other embodiments are described and claimed.

20 Claims, 7 Drawing Sheets

(56) References Cited

OTHER PUBLICATIONS

Wikipedia.org, "Wi-Fi Direct," downloaded Jun. 19, 2014, 4 pages.
International Searching Authority, "Notification of Transmittal of the International Search Report and the Written Opinion of the International Searching Authority," mailed Oct. 13, 2015 in International application No. PCT/US2015/037881.

* cited by examiner

PROVIDING SECURE SEAMLESS ACCESS TO ENTERPRISE DEVICES

TECHNICAL FIELD

Embodiments relate to providing secure and seamless access to protected computing systems.

BACKGROUND

In many enterprises, such as corporations, governmental entities, schools and so forth, a large number of computing systems of many different forms are managed by an information technology (IT) department. IT personnel of such departments have many security concerns with regard to these systems, from security breaches, viruses or other malware, and unauthorized access, among other concerns. These concerns become magnified as more users begin to use their personal devices (so-called "bring your own devices," or BYOD) in the workplace.

Another typical concern is with respect to deploying wireless devices, such as Wi-Fi Direct devices in an enterprise. Such Wi-Fi Direct devices require limited user involvement in the connection process. However such devices suffer from weaker security (as Wi-Fi Direct techniques typically use a push button or a personal identification number (PIN) method for authentication) and the need for user interaction, as an end user is required to press a set of buttons or enter a PIN displayed by one device via a user interface on the other device.

DETAILED DESCRIPTION

Figure 1:
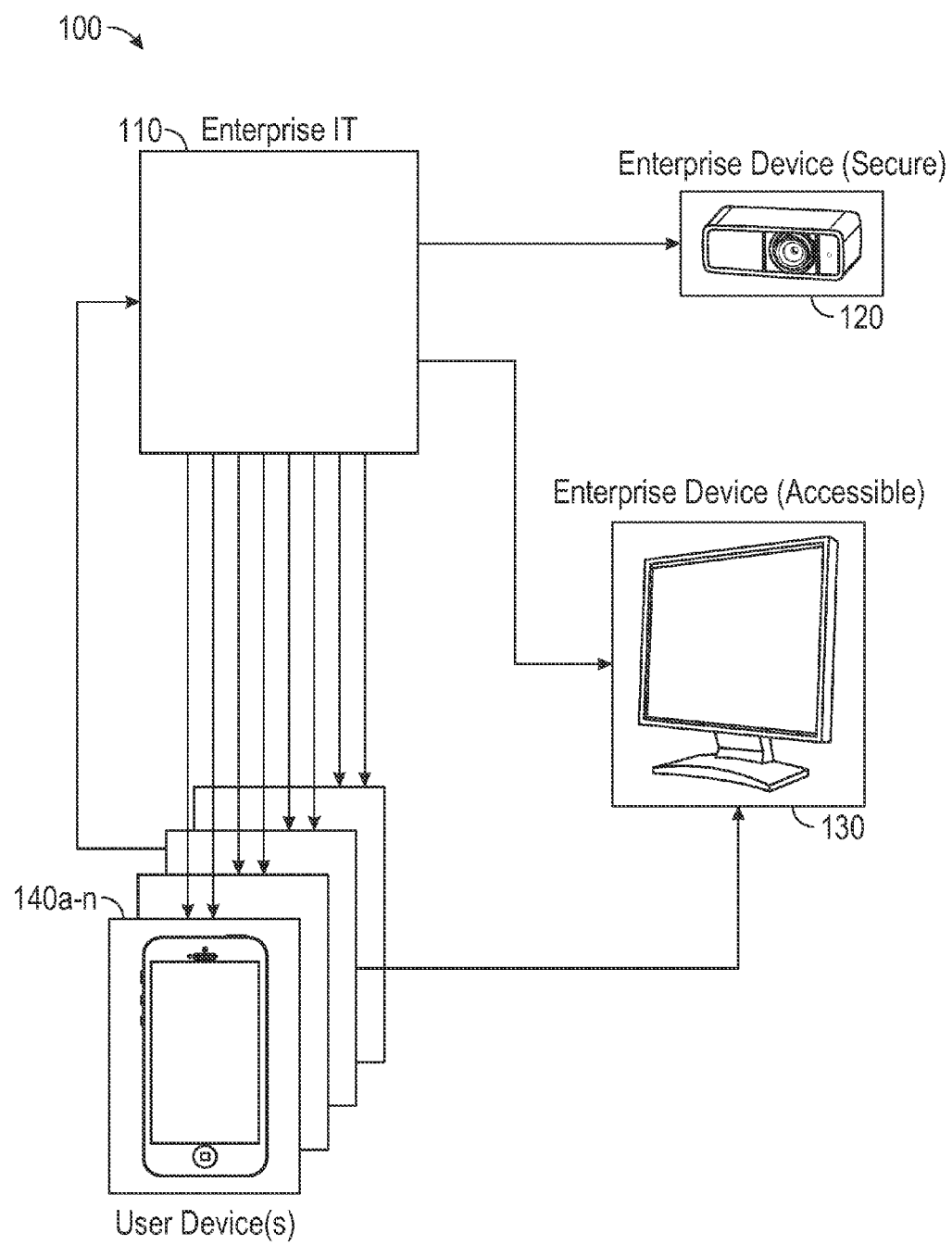
FIG. 1 is a block diagram of an environment in accordance with an embodiment of the present invention.

In various embodiments, a user can make a request for a reservation within an enterprise system and responsive to this request, a scheduling entity may determine whether to grant the request. If such request is granted, information about the reservation and one or more enterprise devices associated with the reservation may be collected and maintained. Furthermore, at least some of this information may be provided to the user to enable a user device of the user to automatically connect with such enterprise devices in a manner transparently to the user, e.g., in a wireless manner, to enable their interaction with the user device during the reservation time. That is, this wireless connection of devices may be initiated and occur without the need for the user to perform any type of authentication-based procedures, including password or PIN entry, pushbutton method or any other authentication process to join or to communicate wirelessly with one or more enterprise devices.

Enterprise networks contain a set of devices that are installed, maintained and managed by IT. These devices are generally wired to one or more enterprise networks, but such devices may also be wireless capable (and/or may only be configured for wireless operation). These IT-managed devices are administered with credentials (like machine generated pre-shared keys, private-public key pairs, digital certificates, etc.). Such enterprise devices are thus on-premises devices physically present in one or more locations of the enterprise. As used herein, there are two classes of on-premises devices, namely a "secure enterprise device" and an "accessible enterprise device." Accessible devices are those devices that are pre-configured with static credentials by IT personnel. Note that while these static credentials may change over time, they change very slowly (once a year, for instance). Instead, a secure device is an enterprise device that is configured with a credential on a per use basis. In many cases, accessible enterprise devices may be assigned permanently to a given user or entity, while secure devices are temporarily assigned, e.g., to one or a small group of users, often for a very short amount of time. Once the usage of a secure device ends (e.g., at the end of a conference room reservation), the credentials assigned to the secure device are revoked and new credentials are assigned, if needed Enterprise networks also support mobile and other portable devices that are authorized by IT. These devices have an IT maintained operating system (OS) configuration and a robust anti-virus demon. These devices also have an IT-accessible (e.g., remotely) secure hypervisor configured to enable IT to frequently audit and isolate devices that are deemed insecure. Note that these IT-supported devices may either be IT-owned (by the enterprise) or end-user owned (as BYOD devices).

While embodiments described herein are in the context of reservation scheduling to reserve access to enterprise devices, understand the scope of the present invention is not limited in this regard and in other embodiments, the techniques described herein may be used to enable user devices to automatically and seamlessly wirelessly connect with protected systems in other contexts.

In various embodiments, a user who seeks to make a reservation for an on-premises device (e.g., reserving a conference room and its associated enterprise devices for a meeting, for instance) may interact with a reservation system managed by IT. This operation implicitly involves reservation of associated wireless devices such as a projector/display in the conference room. To this end, fulfilling the reservation includes providing, e.g., via a push technique, the credential for the on-premises device to one or more user devices such as a mobile/portable device of the end user. In addition, the same credentials may be provided to user devices (e.g., mobile/portable devices) of some or all invitees that are expected to be using the on-premises device during the reservation time. In addition, a reservation can be dynamically updated, e.g., to add ad hoc users that are not part of the original reservation. In an embodiment, the ad hoc users may be added to the reservation by the meeting organizer. Once this happens, the devices assigned to/owned by the ad hoc users can be sent the appropriate credentials in order for them to be able to use the on-premises devices.

After the expiry of the duration for which the reservation of an on-premises device was made, the credentials for the on-premises device that were provided to the participants' mobile/portable may be removed. In addition, if the reservation is for a secure on-premises device, the credentials assigned to the device are removed and new credentials are assigned to the device matching the next reservation, if one exists.

Referring now to FIG. 1, shown is a block diagram of an environment in accordance with an embodiment of the present invention. As shown in FIG. 1, an enterprise environment 100 is an environment including various computing devices of different types. As an example, environment 100 may be a workplace environment, in which access to multiple enterprise devices including enterprise devices 120 and 130 are controlled by an enterprise IT system 110, which in an embodiment may be implemented as one or more server computers and associated storage and other control systems. In an embodiment, IT system 110 may be of an IT group for an enterprise that manages access to all devices operating within the enterprise. IT system 110 may be configured with privileges to provision credentials (assign and/or revoke) and push credentials to devices within the environment to enable access to enterprise devices. IT system 110 may, in addition, be configured to maintain a credential database, a reservation database, and a user database, among other databases. Environment 100 also includes a plurality of user devices 140a-140n. Note that in some embodiments such user devices may be devices of the enterprise assigned to particular employees or other users while in other cases, at least some of these user devices may be a user's own device such as a user's own smartphone, tablet computer or so forth.

Using an embodiment of the present invention, reservation-based access to one or more of enterprise devices 120 and 130 may be controlled via enterprise IT system 110 such that one or more user devices 140 may access these devices according to a given reservation. Assume for purposes of discussion herein, enterprise device 120 is a secure enterprise device and in the example shown corresponds to a projector or other display generation device. In turn, enterprise device 130 may be an accessible enterprise device and in the example shown corresponds to a display that may receive content, e.g., from projector 120 and/or one or more user devices 140. For example, projector 120 and display 130 may be computing resources present in a conference room of the enterprise.

A user may request a reservation for use of the conference room for a given amount of time and further request access to one or more enterprise devices within the conference room during the time of the reservation. To this end, a user may issue a reservation request to enterprise IT system 110 to reserve a conference room and all of its computing resources for a given duration, e.g., for a meeting. After a reservation is granted, the requesting user device as well as any user devices of invitees to the meeting may receive credential packages for one or more of the enterprise devices within the conference room. These credential packages may be used by the user device to automatically and wirelessly connect to the enterprise devices during the course of the meeting. Note that the user device that receives the credential package connects directly to the corresponding enterprise device, and not via the enterprise network, to which both devices have access. Thus at the scheduled start of the reservation, any participant who is part of the reservation can establish a session with the corresponding enterprise device. Note that there is no need for the given enterprise device to display its credential within a user interface, since the credential is already known to the user device. Thereafter, the credentials may be removed or otherwise revoked.

In an embodiment, an authentication credential may take the form of a Wi-Fi Protected Access (WFA) Wi-Fi Protected Setup (WPS) PIN that may be communicated via an enterprise network to the corresponding enterprise device.

Figure 2:
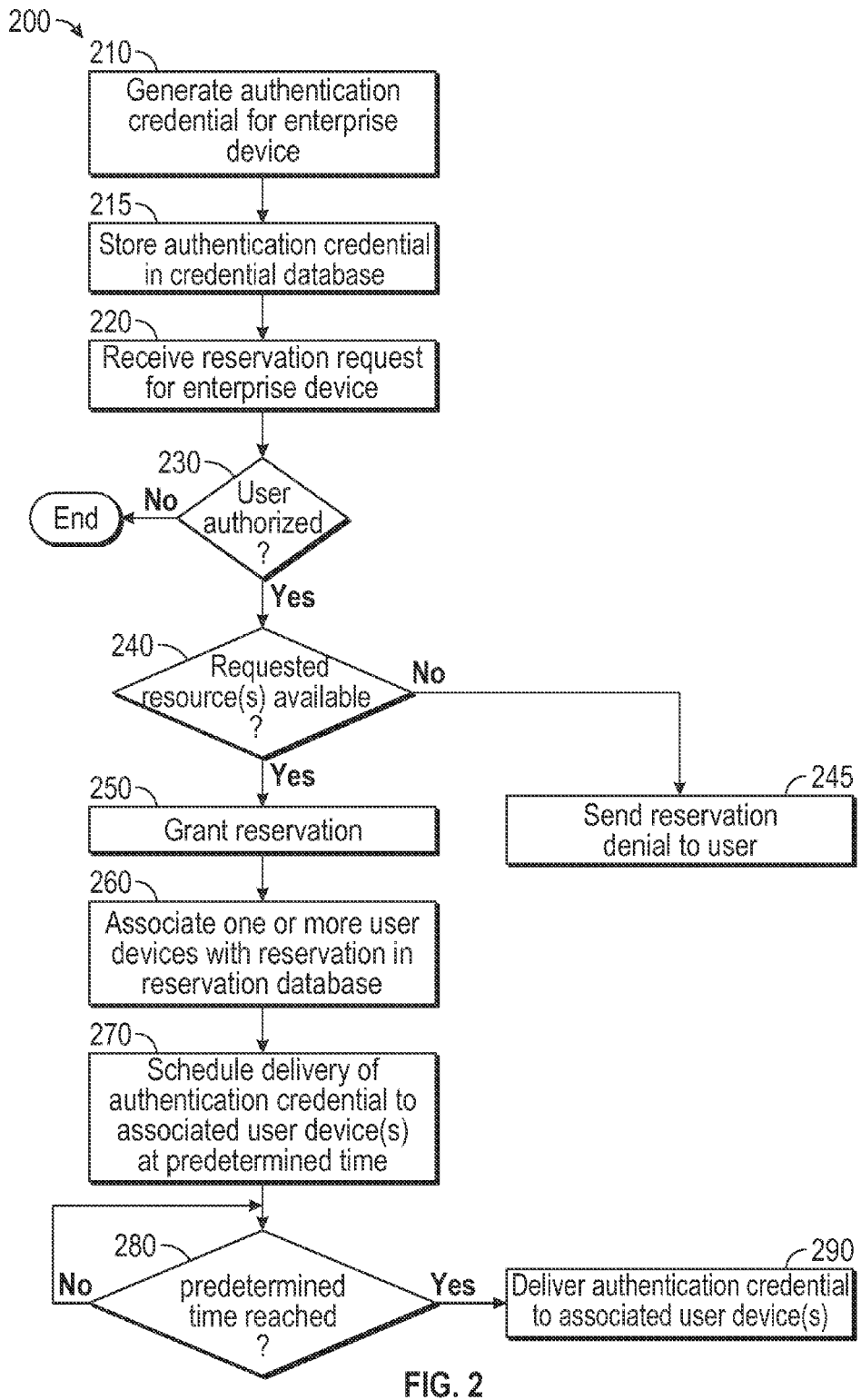
FIG. 2 is a flow diagram of a method in accordance with an embodiment of the present invention.

Referring now to FIG. 2, shown is a flow diagram of a method in accordance with an embodiment of the present invention. More specifically, method 200 of FIG. 2 shows a method for handling incoming reservations in an IT system such as IT server of an enterprise. As seen, method 200 begins by generating an authentication credential for an enterprise device (block 210). Understand that various types of credentials may be used in different embodiments. For example, in some embodiments the credential may take the form of machine-generated pre-shared keys, private-public key pairs, digital certificates or so forth. In an embodiment, the type of credential used is identified by the term Config-Method (as described in the WFA WPS specification). The ConfigMethods supported by a user device are sent to the enterprise device, and the enterprise device selects a method from the list of supported ConfigMethods.

Note also that a set of messages exchanged between two devices during an authentication process depends on the ConfigMethod chosen. For example, if the PIN method is chosen, the user device may send a hashed version of the PIN (the PIN itself is not sent to prevent snooping) to the enterprise device. Note the hash is a one-way function and one cannot derive the PIN from the hash. In turn, the enterprise device compares the hash of PIN sent from the user device with an expected hash value, and allows the connection procedure to proceed if and only if there is a match.

Still referring to FIG. 2, next this authentication credential may be stored in a credential database (block 215). This credential database may be part of the IT server or may be present in a storage device coupled to the server.

Note that this authentication credential generation and storage may occur asynchronously to any incoming reservation request. For example, for an accessible device, this generated credential may be static or at least substantially static (e.g., changing only on an annual or other long-term basis). As such, authentication credentials for accessible devices may be generated whenever a new enterprise device is added into an enterprise network.

Still referring to FIG. 2, control next passes to block 220 where a reservation request may be received for an enterprise device. Thereafter control passes to diamond 230 to determine whether the user who has requested the reservation is authorized. As an example, the authorization determination may take the form of simply confirming that a user ID of the user indicates that the user is a current employee of the enterprise. Of course additional authentication mechanisms may occur. For example, the IT server may only allow reservations for conference rooms to which the user is allowed access, e.g., according to a given reservation policy for a conference room, resource or so forth. If the user is not authorized, method 200 may conclude. Note that in some examples, a notice may be sent to the requesting user to indicate that the reservation was not granted.

As further shown in FIG. 2, next control passes to diamond 240 to determine whether the requested resource or resources are available. Such determination may be based on information in a reservation database. For example, when a user requests a conference room for a particular meeting time, the system may determine whether the conference room is available at that time. If not, control passes to block 245 where a reservation denial may be sent to the user.

Control next passes to block 250 where a reservation may be granted. To this end, the IT server may send a reservation confirmation to the user to indicate that the reservation request was successful. In addition, such confirmation may also be sent to any invitees to the meeting. Next at block 260 one or more user devices may be associated with the reservation in a reservation database. For example, these user devices may be of the requester and invitees, and a user identifier for each such user device may be obtained, e.g. from a user database of the IT system, where various information of users, e.g., employees, is included. Such information may include a user ID (e.g. corresponding to an employee number) and a user device identifier for one or more user devices associated with that user. Note for purposes of discussion herein, there may be multiple user devices associated with a given user, such as a desktop computer assigned by IT to the user/employee, as well as one or more additional devices, e.g., BYOD devices such as a smartphone, tablet computer or so forth of the user.

Control next passes to block 270 where delivery of one or more authentication credentials for the requested resources may be scheduled. More specifically, this delivery of the authentication credential may be scheduled to occur at a predetermined time in proximity to the actual meeting time. For example, a configurable number may be set at 5 minutes prior to the meeting, to ensure that users are not able to access the protected resources outside of the allotted meeting time. Note that this delivery schedule may be included in the reservation entry of the reservation database itself to enable the automatic delivery of the information, including one or more authentication credentials to various user devices at the appropriate time. Or this scheduled time may be inferred as an offset from a start time.

Still referring to FIG. 2, next at diamond 280 it is determined whether this predetermined time has been reached. When the time is reached, control passes to block 290 where the authentication credential may be sent to the associated user device(s). In the case of a secure enterprise device, the authorization credential also may be sent to the secure enterprise device itself. Understand while shown at this high level in the embodiment of FIG. 2, many variations and alternatives are possible.

Figure 3:
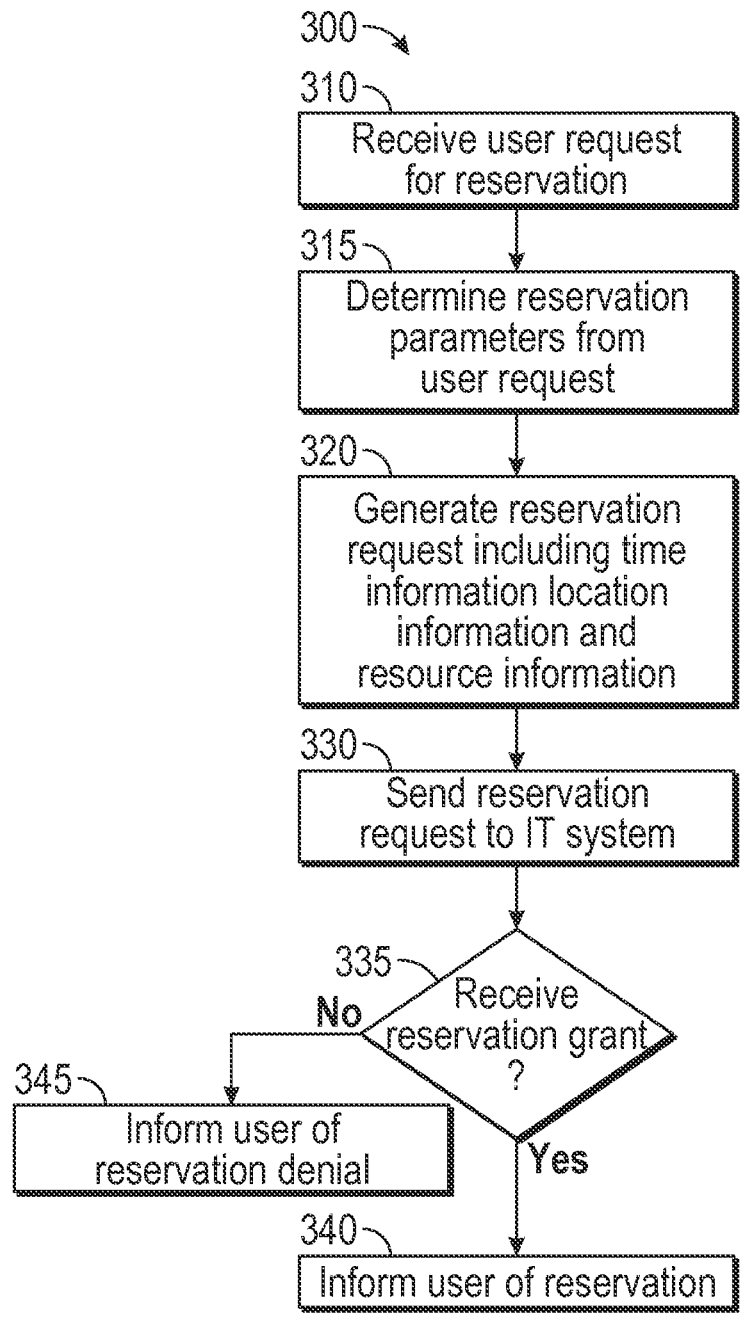
FIG. 3 is a flow diagram of a reservation handling method by a user device in accordance with an embodiment of the present invention.

Next referring to FIG. 3, shown is a flow diagram of a reservation handling method by a user device in accordance with an embodiment of the present invention. As shown in FIG. 3, method 300 may be performed within a user device, such as a given computer system of a user. Again for purposes of discussion assume that the user is an employee of an enterprise using a reservation system in accordance with an embodiment. Method 300 begins by receiving a user request for a reservation (block 310). Note that a set of attributes describing the reservation (referred to herein as "reservation parameters") may be received in this reservation request, which may be realized via a user input of information into a web fillable form. As an example, a user interface application for the reservation system may enable a user to enter the reservation parameters for the request. Next at block 315 reservation parameters may be determined from the user request. Such reservation parameters may include an identifier of the requester, e.g., a user or employee ID, a date and time of the reservation request, a location for the reservation, e.g., conference room or other location, as well as an identification of one or more resources, e.g., enterprise devices to be reserved. Note that in situations such as a conference room reservation, the request for such resources may be implicit in that when a reservation for a conference room is granted, all enterprise devices within that conference room may be part of the reservation.

Next at block 320 the reservation in question may be generated, which includes the reservation parameters associated with the reservation and a reservation ID, for instance. For example, in one embodiment such information includes time information corresponding to a beginning and end time and/or duration of the reservation, location information corresponding to a location of the reservation such as a given conference room, resource information such as identifiers for each resource such as enterprise device to be reserved. Next at block 330 this reservation request may be sent to the IT system. Requests can be sent in various manners, including via an email request or as a direct entry into a web fillable form of the reservation system.

Next, it is determined at diamond 335 if a reservation granted response message is received for the request. If not, the user may be informed of the reservation denial at block 345. Such denial may be as a result of unavailability of one or more requested resources and/or due to lack of a user authorization to access one or more the requested resources. If instead the IT server grants the reservation, control passes to block 340 where the user may be informed of the reservation.

Figure 4:
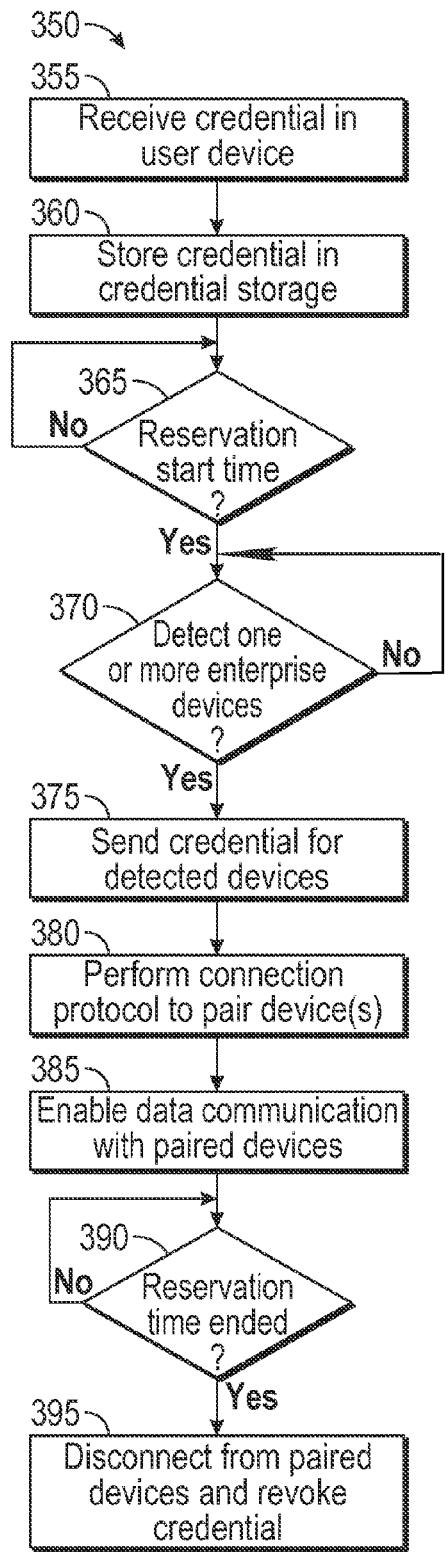
FIG. 4 is a flow diagram of a method for accessing an enterprise device via a user device in accordance with an embodiment.

Now referring to FIG. 4, shown is a flow diagram of a method for accessing an enterprise device via a user device in accordance with an embodiment. Method 350 may be performed by a user device that includes various hardware, software and/or firmware. Such components may include a wireless communication module that enables wireless communication of information as well as reservation handling logic which may include or be associated with an application to handle the reservation process on behalf of the user device. Still further, additional components of the user device such as a display control logic also may be involved to enable communication of the information to be displayed on a screen corresponding to one of the enterprise devices.

As seen, method 350 begins by receiving a credential in the user device (block 355). As described above, this credential, which may be for a single enterprise device within a conference room, may be received at a time proximate to a beginning of the corresponding meeting. This credential may be stored in a credential storage of the user device (block 360). As an example, this credential storage may be a protected storage of the device. Control next passes to diamond 365 to determine whether the start time of the reservation has occurred. When it does, control passes to diamond 370 to determine whether one or more enterprise devices are detected in a local area with the user device. For example, a wireless communication module may perform a device discovery procedure as defined by the communication protocol between the user device and the enterprise device to identify the presence of other wireless capable devices.

Upon discovery of one or more enterprise devices that have a resource identifier corresponding to a resource identifier associated with the received credential, control passes to block 375 where, as part of a wireless connection protocol between the devices, the credential may be sent to such discovered devices. Next at block 380 an authentication protocol may continue to pair the devices, such as the WPS protocol described above. In the example herein of a user device such as a laptop or smartphone, assume that the pairing is with a large flat screen display configured with wireless capability, e.g., a display within the conference room having Intel™ WiDi™ or Intel™ WiDi Pro™ technology to which the user desires to project a presentation such as a PowerPoint™ presentation, video presentation or so forth.

Using an embodiment, a wireless connection protocol may proceed without user interaction such as by way of PIN display and entry. As such, embodiments may implement complicated PINs that are cumbersome to enter but cryptographically stronger. Still further, user experience may be improved without this user involvement (including user actuation or PIN entry), and without any loss of security. In contrast, a conventional WFA WPS PIN method requires dynamic generation of a PIN, which is displayed on one device and is entered by the user in another device in order to perform authentication. Note that various messages may be exchanged between enterprise IT and the enterprise device to provide a credential assigned to the enterprise device, among other information.

As a result of this authentication protocol, the devices may be paired. Next at block 385 upon pairing of devices, data communication between the devices is enabled. In this way, a presentation on the small screen of the user device may be wirelessly communicated and displayed on the conference room display also. Control next passes to diamond 390 to determine whether the reservation time has ended. If so, control passes to block 395 where the user device may be disconnected from the paired devices. Furthermore, the credential may be revoked from the user device. This revocation may be effected by deleting the credential present in the credential storage of the user device such that the device is no longer enabled or allowed to access the enterprise devices in the context of the now concluded reservation. Understand while shown with this particular implementation, many further details and variations are possible.

Figure 5:
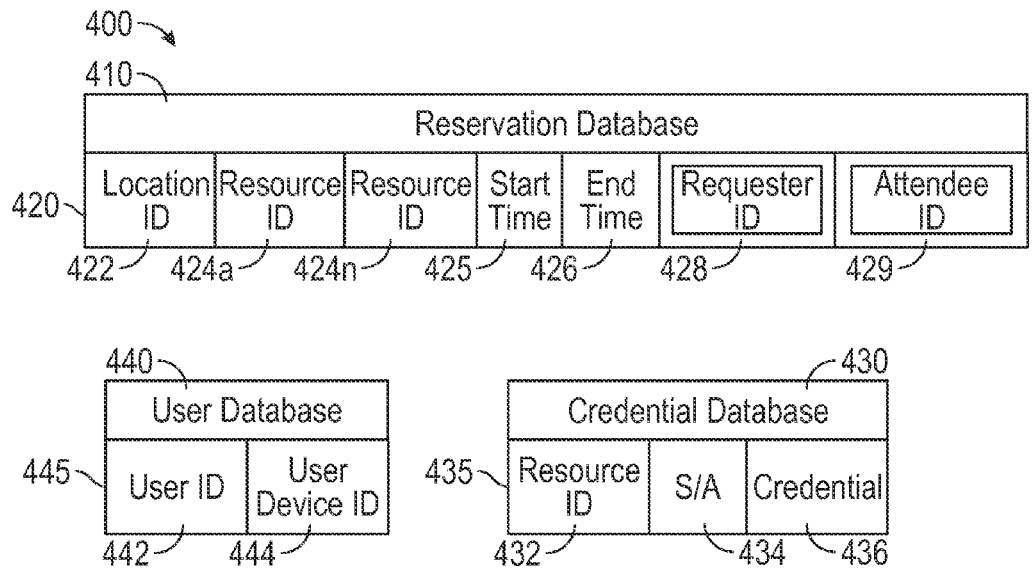
FIG. 5 is an illustration of an IT database in accordance with an embodiment.

Referring now to FIG. 5, shown is an illustration of an IT database 400 in accordance with an embodiment. In various embodiments, database 400 may be stored in a storage of one or more interconnected computer systems such as a backend IT system of an enterprise. For example, database 400 may take the form of a storage system such as a storage area network (SAN), network attached storage (NAS) or other storage system accessible to multiple server and other systems.

As seen, database 400 includes a reservation database 410 having a plurality of entries 420. A representative entry 420 shown in FIG. 5 includes various information associated with a single reservation (such as a conference room reservation for a meeting). As seen, entry 420 includes a location identifier field 422 to store an identification of the location of the conference room. In turn, one or more resource ID fields 424$_a$-424$_n$ are present, which may store identifiers for various enterprise devices present with in the conference room, such as projector, conference room display and so forth. In addition, entry 420 includes a start time field 425 and an end time field 426. Also shown in an entry 420 are a requester ID field 428 which may store a user ID for a requester of the meeting and one or more attendee ID fields 429 which may store user IDs for various invitees to the meeting.

Still referring to FIG. 5, a credential database 430 is also present. In an embodiment, credential database 430 includes multiple entries 435. Each such entry may include a resource identifier 432 to store an identifier for a given enterprise device. In addition, a type field 434 stores an indicator to indicate whether the corresponding enterprise device is a secure device or an accessible device. Finally, a credential field 436 may store a credential for the device. Understand that this credential may be a static credential in the case of an accessible device or a one-time (dynamic) credential in the case of a secure device.

Still referring to FIG. 5, a user database 440 is also present. User database 440 includes multiple entries 445, each associated with a given user or employee. As seen, each entry 445 includes a user ID field 442 to store a user ID and one or more device identifier fields 444 to store an identifier for a user device associated with the user. As discussed above, such user devices may include an IT-issued desktop computer, laptop computer, tablet computer, smartphone or so forth. In addition, one or more IT-authorized BYOD devices also may be provided with user device IDs to be stored in a field 444. Understand while shown with this particular example, information additional and/or different information may be present within the various databases in another embodiment.

Figure 6:
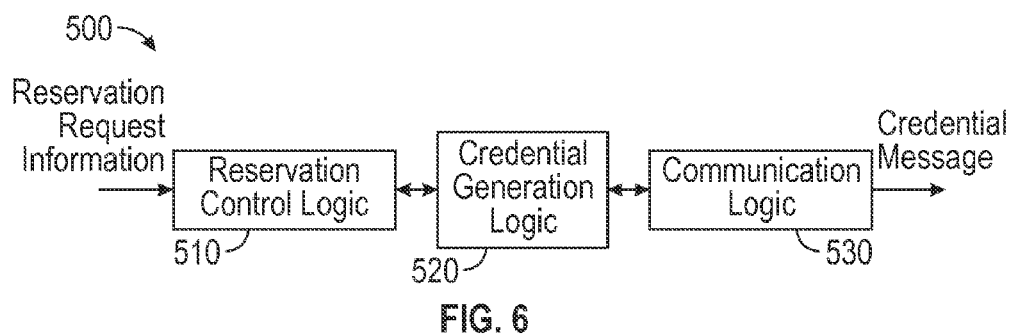
FIG. 6 is a block diagram of a portion of an IT system in accordance with an embodiment.

Referring now to FIG. 6, shown is a block diagram of a portion of an IT system 500 in accordance with an embodiment. As seen, IT system 500 includes various logic (which may be implemented as a hardware, software or firmware within or to be executed on one or more cores of one or more processors of system 500) to perform reservation and related handling as described herein. Incoming reservation requests may be received in a reservation control logic 510 which may perform at least portions of method 200 of FIG. 2 above. In turn, reservation control logic 510 may couple to a credential generation logic 520. In various embodiments, logic 520 may be configured to generate credentials for various enterprise devices and to store the credentials with an identifier for the associated enterprise device in a credential database. Logic 520 may further be configured to revoke credentials within the credential database, e.g., upon their use for a secure device that is provided with a one-time use credential, or according to a longer-term interval for a static credential, such as on an annual or semi-annual basis. As further illustrated in FIG. 6, logic 520 couples to a communication logic 530 that may be configured to send a credential message to various users in advance of an upcoming reservation. Of course understand that an IT system may include many more components as is typical in a server computer.

Figure 7:
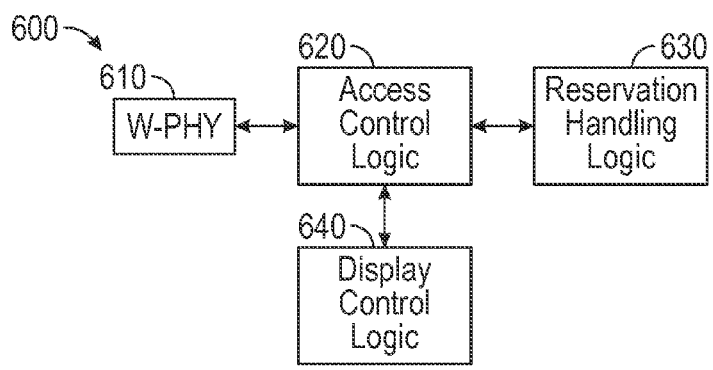
FIG. 7 is a block diagram of a user device in accordance with one embodiment of the present invention.

Referring now to FIG. 7, shown is a block diagram of a user device in accordance with an embodiment of the present invention. In the embodiment of FIG. 7, user device 600 includes various components and logic to perform reservation handling and wireless communication with paired devices. As seen, user device 600 includes a wireless physical unit (PHY) 610 which in an embodiment may be a PHY of a given wireless application protocol such as an IEEE 802.11, near field connection, and/or Bluetooth™ standard. Physical unit 610 couples to an access control logic 620 that may perform various control functions with regard to wireless communications. In turn access control logic 620 couples to a reservation handling logic 630. In various embodiments, reservation handling logic 630 may perform the reservation operations as described herein. For example, a user application may be configured to provide a user interface display to enable the application to receive and process reservation information to generate a reservation request to be communicated to an IT system of an enterprise. Note that this reservation request communication need not be performed wirelessly and may be implemented in a wired manner.

As further illustrated in FIG. 7, a display control logic 640 may be present, which may be a display controller configured to receive information such as frame data received from an application executing on the device and to provide display control signals, e.g., to a local display of the device (not shown for ease of illustration in FIG. 7). Display control logic 640 may further send control signals to access control logic 620 to enable the corresponding display, e.g., of presentation materials on a display such as a WiDi™ display of a conference room. Note that the initialization and pairing of user device and display occurs seamlessly without user interaction, as described herein. Although these limited components are shown for ease of illustration in FIG. 7, understand the scope of the present invention is not so limited and a given user device may include many more components as in typical in such device.

Figure 8:
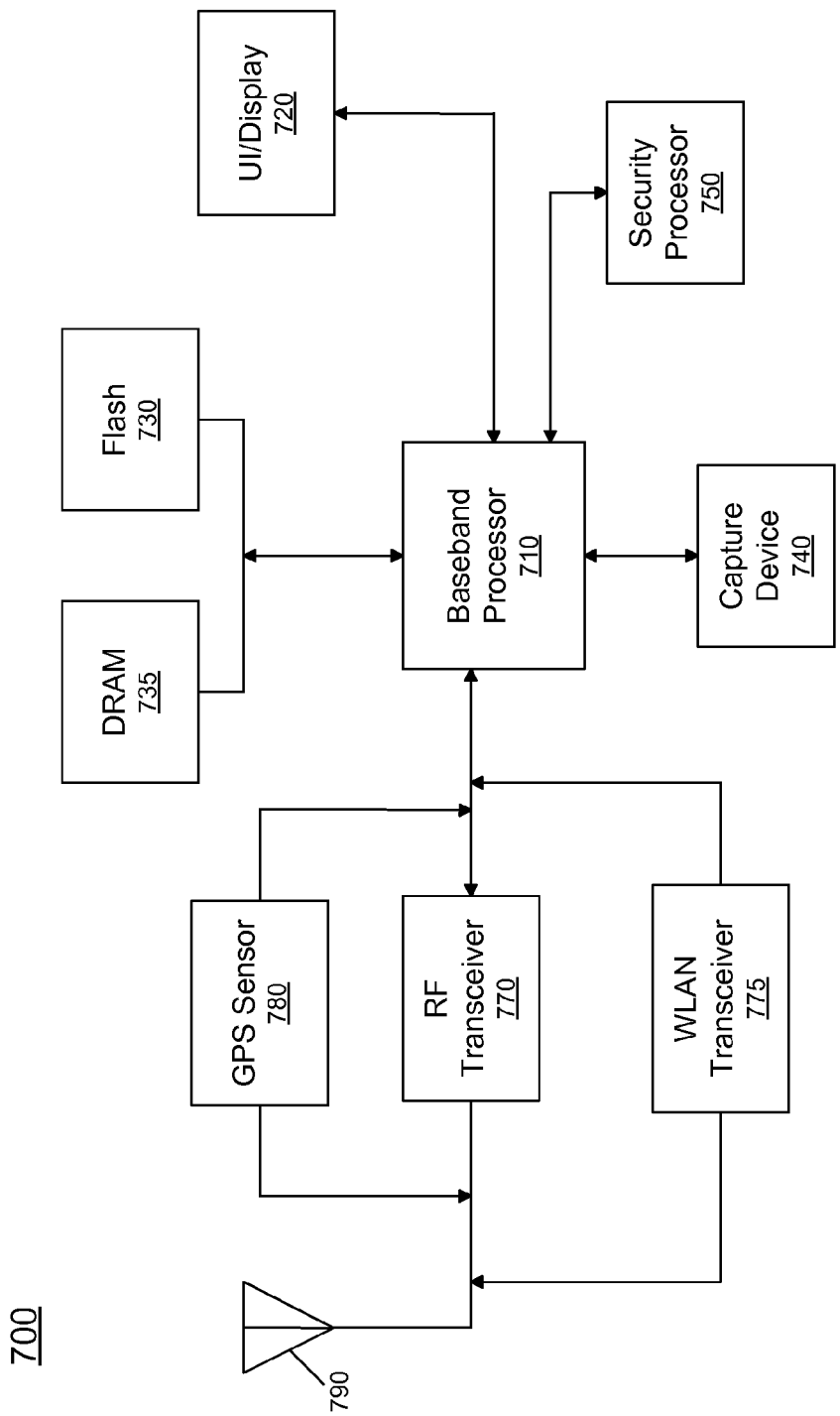
FIG. 8 is a block diagram of an example system with which embodiments can be used.

Referring now to FIG. 8, shown is a block diagram of an example system 700 with which embodiments can be used. As seen, system 700 may be a smartphone or other wireless communicator. System 700 may represent user device 600 of FIG. 7, in an embodiment, which may be used to request reservations, and to seamlessly wirelessly directly connect to one or more enterprise devices as described herein. As shown in the block diagram of FIG. 8, system 700 may include an application or baseband processor 710. In general, baseband processor 710 can perform various signal processing with regard to communications, as well as perform computing operations for the device. In turn, baseband processor 710 can couple to a user interface/display 720 which can be realized, in some embodiments by a touch screen display. Baseband processor 710 may execute one or more applications using logic described herein to reserve enterprise devices and/or other resources and to enable seamless wireless connection to such enterprise devices, in an embodiment. In addition, baseband processor 710 may couple to a memory system including, in the embodiment of FIG. 8, a non-volatile memory, namely a flash memory 730 and a system memory, namely a dynamic random access memory (DRAM) 735. As further seen, baseband processor 710 can further couple to a capture device 740 such as an image capture device that can record video and/or still images.

Also included in system 700 is a security processor 750 that may couple to baseband processor 710. In the embodiment shown, security processor 750 is a separate component of the system, however understand that the various security operations performed by security processor 750 instead can be performed in baseband processor 710.

To enable communications to be transmitted and received, various circuitry may be coupled between baseband processor 710 and an antenna 790. Specifically, a radio frequency (RF) transceiver 770 and a wireless local area network (WLAN) transceiver 775 may be present. In general, RF transceiver 770 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 780 may be present. Other wireless communications such as receipt or transmission of radio signals, e.g., AM/FM and other signals may also be provided. In addition, via WLAN transceiver 775, local wireless signals, such as according to a Bluetooth™ standard or an IEEE 802.11 standard such as IEEE 802.11a/b/g/n can also be realized. Although shown at this high level in the embodiment of FIG. 8, understand the scope of the present invention is not limited in this regard.

Figure 9:
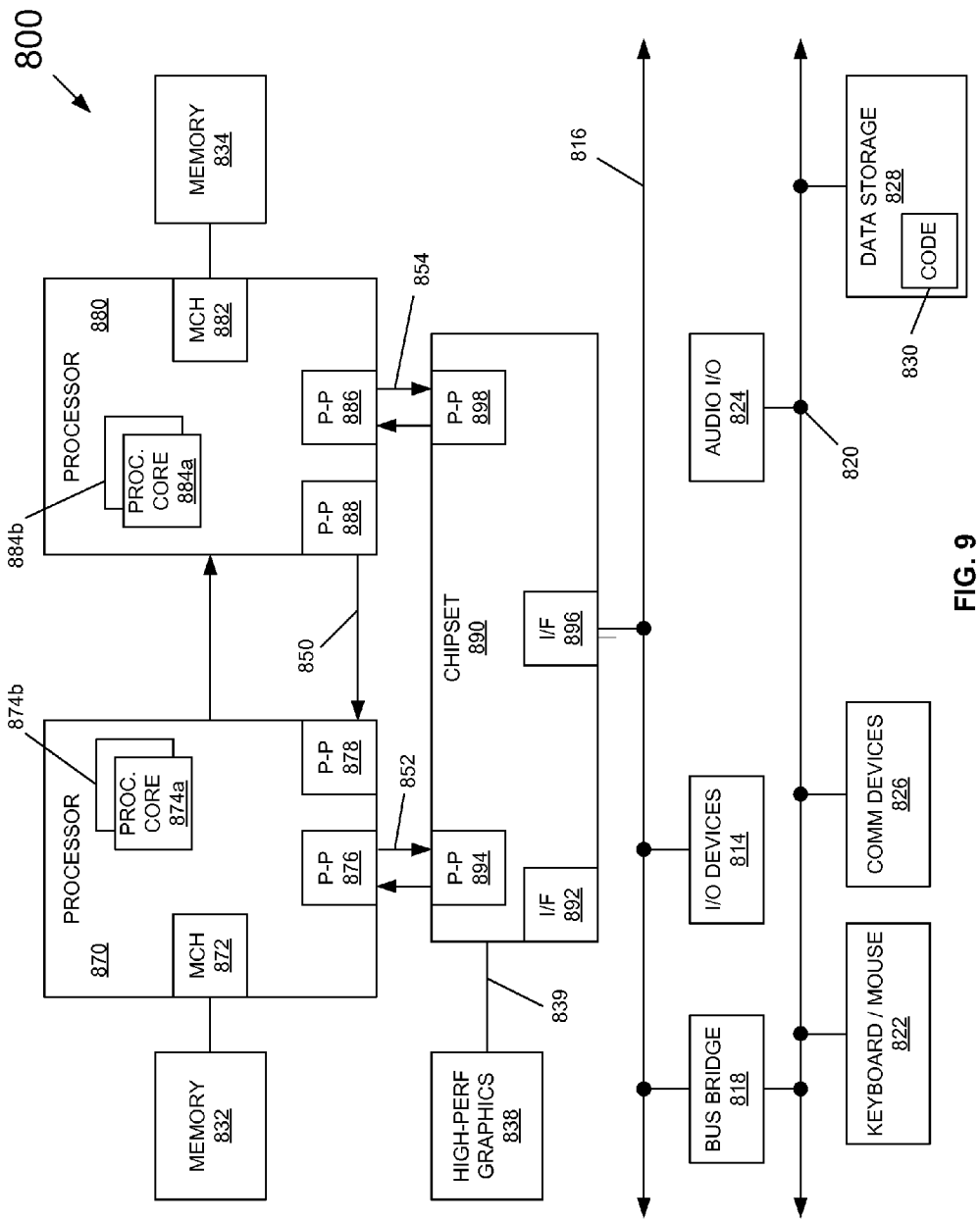
FIG. 9 is a block diagram of an enterprise system in accordance with an embodiment.

Referring now to FIG. 9, shown is a block diagram of an enterprise system, which may take the form of a backend IT server (or may be a secure or accessible enterprise device to which a user seeks access). As seen, multiprocessor system 800 is a point-to-point interconnect system, and includes a first processor 870 and a second processor 880 coupled via a point-to-point interconnect 850. As shown in FIG. 9, each of processors 870 and 880 may be multicore processors, including first and second processor cores (i.e., processor cores 874a and 874b and processor cores 884a and 884b), although potentially many more cores may be present in the processors. Each of the processors can include logic to perform the reservation control and potentially to perform a seamless wireless pairing with user devices, as described herein. System 800 may represent IT system 500 of FIG. 6, in an embodiment.

Still referring to FIG. 9, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 852 and 854, respectively. As shown in FIG. 9, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 9, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 (such as may be used to wirelessly connect with user devices in a local area) and a data storage unit 828 such as a disk drive or other mass storage device which may include code 830, in one embodiment. Further, an audio I/O 824 may be coupled to second bus 820.

The following examples pertain to further embodiments.

In Example 1, a system comprises: at least one processor having at least one core including a reservation control logic to receive a request from a user device for access at a future time to an enterprise device, where the reservation control logic is to grant a reservation to the user device to enable the access, and to schedule delivery of an authentication message to the user device including a credential to enable the user device to set up an ad hoc wireless connection with the enterprise device at the future time without involvement of a user of the user device. The system may further include a storage coupled to the at least one processor to store a reservation database including a plurality of entries each associated with a reservation granted by the reservation control logic.

In Example 2, the system of Example 1 further includes a credential generation logic coupled to the reservation control logic to generate the credential and to store the credential in an entry of a credential database associated with the enterprise device, the credential database stored in the storage.

In Example 3, the reservation control logic of Example 2 is optionally to request the credential generation logic to generate the credential responsive to receipt of the request, where the enterprise device comprises a secure enterprise device, the credential comprising a one time use credential.

In Example 4, the credential generation logic is optionally to cause the credential to be removed from the credential database after the future time.

In Example 5, the reservation control logic of any of the above Examples is to generate an entry in the reservation database associated with the reservation, the entry to store an identifier of the enterprise device, the future time, an identifier of the user device, and an identifier of at least one additional user device of an invitee to a meeting associated with the reservation.

In Example 6, the system of Example 5 further comprises a communication logic coupled to the reservation control logic to send the grant to the user device.

In Example 7, the communication logic of Example 6 is to access the entry in the reservation database to obtain the user device identifier and the at least one additional user device identifier and the enterprise device identifier, to access the credential database to obtain the credential using the enterprise device identifier, and to send the authentication message including the credential to the user device.

In Example 8, the communication logic of one of Examples 6-7 is to send the authentication message to the user device at a scheduled delivery time proximate to the future time.

In Example 9, the communication logic of Example 8 is optionally further to send the authentication message to the at least one additional user device at the scheduled delivery time.

In Example 10, a method comprises: receiving a request to reserve at least one enterprises resource; generating a reservation for the at least one enterprise resource and associating at least one user device with the reservation; and scheduling delivery of a credential package to the at least one user device, the credential package delivery to occur at a first time proximate to a reservation time of the reservation, the credential package including a credential for the at least one enterprise resource, where the at least one user device is to automatically initiate wireless access to the at least one enterprise resource during the reservation time using the credential.

In Example 11, the method of Example 10 further comprises optionally enabling the at least one user device to automatically initiate the wireless access to the at least one enterprise resource without user entry of a password or a personal identifier or push button activation on either of the at least one enterprise resource and the at least one user device.

In Example 12, the method of Examples 10 or 11 further comprises optionally accessing a reservation database to determine whether to grant the reservation, and if so inserting an entry in the reservation database for the reservation, the entry including a resource identifier for the at least one enterprise resource, a start time of the reservation time, an end time of the reservation time, and a requester identifier associated with a requester of the reservation.

In Example 13, the method of Example 12 further comprises optionally accessing a credential database using the resource identifier for the at least one enterprise resource obtained from the entry in the resource database to obtain the credential from the credential database, and communicating the credential to the at least one user device.

In Example 14, the method of Example 13 further comprises, when the at least one enterprise resource comprises a secure enterprise resource, generating the credential for the at least one enterprise resource and inserting the credential in the credential database with an indicator to indicate that the credential is for a single use.

In Example 15, the method of Example 14 optionally further comprises sending the credential to the at least one enterprise resource for storage in a credential storage of the at least one enterprise resource, where responsive to an indication associated with the credential the at least one enterprise resource is to remove the credential at a conclusion of the reservation time.

In Example 16, a machine-readable storage medium includes machine-readable instructions, when executed, to implement a method of any one of Examples 10 to 15.

In Example 17, an apparatus comprises means to perform a method of any one of Examples 10 to 15.

In Example 18, an apparatus comprises: a reservation handling logic to receive a user request to reserve an enterprise device for a time period and to generate a reservation request to send to an IT system that manages the enterprise device and to receive, responsive to the reservation request, a credential package including a credential for the enterprise device; an access control logic coupled to the reservation handling logic to implement a wireless connection protocol with the enterprise device using the credential in a manner transparent to a user of the apparatus; and a display control logic coupled to the access control logic, where, after a wireless connection is established responsive to the wireless connection protocol, the display control logic is to communicate display control signals to the enterprise device via the access control logic to enable a user interface of a file accessible to the apparatus to be displayed on a display of the enterprise device.

In Example 19, the reservation handling logic of Example 18 is optionally to receive the credential package at a time proximate to the time period.

In Example 20, the reservation handling logic of one of Examples 18 and 19 is optionally to store the credential in a storage of the apparatus, and after the time period, to delete the credential.

In Example 21, the wireless connection protocol comprises a wireless protected setup protocol without user interaction with the apparatus or the enterprise device.

In Example 22, the apparatus of any one of Examples 18-21 comprises a mobile device of the user and the enterprise device comprises a display system present in a conference room reserved by the IT system.

In Example 23, a system for managing enterprise resource access comprises: means for receiving a request to reserve at least one enterprises resource; means for generating a reservation for the at least one enterprise resource and associating at least one user device with the reservation; and schedule delivery means for delivering a credential package to the at least one user device, the schedule delivery means for delivering the credential package at a first time proximate to a reservation time of the reservation, the credential package including a credential for the at least one enterprise resource, where the at least one user device is to automatically initiate wireless access to the at least one enterprise resource during the reservation time using the credential.

In Example 24, the system of Example 23 further comprises means for accessing a reservation database to determine whether to grant the reservation, and if so the means for accessing further for inserting an entry in the reservation database for the reservation, the entry including a resource identifier for the at least one enterprise resource, a start time of the reservation time, an end time of the reservation time, and a requester identifier associated with a requester of the reservation.

In Example 25, the system of Example 23 or 24 further comprises means for accessing a credential database using the resource identifier for the at least one enterprise resource obtained from the entry in the resource database to obtain the credential from the credential database, and for communicating the credential to the at least one user device.

In Example 26, the system of Example 25 optionally further comprising means for generating the credential for the at least one enterprise resource and inserting the credential in the credential database with an indicator to indicate that the credential is for a single use.

In another Example, a computer readable medium including instructions is to perform the method of any of the above Examples. Still further, in another Example, an apparatus comprises means for performing the method of any of the above Examples.

Understand also that various combinations of the above Examples are possible.

In different implementations, a user device may include an interface to enable the automated wireless connection protocol with protected devices as described herein. In one example, an application programming interface (API) may be supported by an OS or other system software. This API may provide a user interface via a reservation application, as an example. In some cases, a user may be prompted by a user interface to choose whether to connect automatically as described herein (when possible) or to select a user-controlled connection protocol where a user is to input a PIN, other entry, or perform user actuation to initiate a connection.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
at least one processor having at least one core including a reservation control logic to receive a request from a user device for access at a future time to an enterprise device managed by the system, the enterprise device having at least one display, the reservation control logic to grant a reservation to the user device to enable the access, wherein the reservation control logic is to schedule delivery of an authentication message to the user device including a credential generated by the system to enable the user device to set up an ad hoc wireless connection with the enterprise device to pair the user device with the enterprise device at the future time without involvement of a user of the user device, to enable the user device to wirelessly communicate content to the enterprise device for display on the at least one display of the enterprise device during the future time; and
a storage coupled to the at least one processor to store a reservation database including a plurality of entries each associated with a reservation granted by the reservation control logic.

2. The system of claim 1, further comprising a credential generation logic coupled to the reservation control logic to generate the credential and to store the credential in an entry of a credential database associated with the enterprise device, the credential database stored in the storage.

3. The system of claim 2, wherein the reservation control logic is to request the credential generation logic to generate the credential responsive to receipt of the request, wherein the enterprise device comprises a secure enterprise device, the credential comprising a one time use credential, wherein the credential generation logic is to cause the credential to be removed from the credential database after the future time.

4. The system of claim 1, wherein the user device is to directly connect to the enterprise device at the future time without interaction with an enterprise network.

5. The system of claim 1, wherein the reservation control logic is to generate an entry in the reservation database associated with the reservation, the entry to store an identifier of the enterprise device, the future time, an identifier of the user device, and an identifier of at least one additional user device of an invitee to a meeting associated with the reservation.

6. The system of claim 5, further comprising a communication logic coupled to the reservation control logic to send the grant to the user device.

7. The system of claim 6, wherein the communication logic is to access the entry in the reservation database to obtain the user device identifier and the at least one additional user device identifier and the enterprise device identifier, to access the credential database to obtain the credential using the enterprise device identifier, and to send the authentication message including the credential to the user device.

8. The system of claim 7, wherein the communication logic is to send the authentication message to the user device at a scheduled delivery time proximate to the future time.

9. The system of claim 8, wherein the communication logic is further to send the authentication message to the at least one additional user device at the scheduled delivery time.

10. At least one non-transitory computer readable medium including instructions that when executed enable a system to:
receive a request to reserve at least one enterprise resource managed by the system, the at least one enterprise resource having at least one display;
generate a reservation for the at least one enterprise resource and associate at least one user device with the reservation; and schedule delivery of a credential package to the at least one user device, the credential package delivery to occur at a first time proximate to a reservation time of the reservation, the credential package including a credential for the at least one enterprise resource, wherein the at least one user device is to automatically initiate wireless access to the at least one enterprise resource during the reservation time using the credential to pair the at least one user device and the at least one enterprise resource, to enable the at least one user device to wirelessly communicate content for display on the at least one display of the at least one enterprise resource during the reservation time.

11. The at least one non-transitory computer readable medium of claim 10, further comprising instructions that when executed enable the system to enable the at least one user device to automatically initiate the wireless access to the at least one enterprise resource without user entry of a password or a personal identifier or push button activation on either of the at least one enterprise resource and the at least one user device.

12. The at least one non-transitory computer readable medium of claim 10, further comprising instructions that when executed enable the system to access a reservation database to determine whether to grant the reservation, and if so to insert an entry in the reservation database for the reservation, the entry including a resource identifier for the at least one enterprise resource, a start time of the reservation time, an end time of the reservation time, and a requester identifier associated with a requester of the reservation.

13. The at least one non-transitory computer readable medium of claim 12, further comprising instructions that when executed enable the system to access a credential database using the resource identifier for the at least one enterprise resource obtained from the entry in the resource database to obtain the credential from the credential database, and to communicate the credential to the at least one user device.

14. The at least one non-transitory computer readable medium of claim 13, further comprising instructions that when executed enable the system, when the at least one enterprise resource comprises a secure enterprise resource, to generate the credential for the at least one enterprise resource and to insert the credential in the credential database with an indicator to indicate that the credential is for a single use.

15. The at least one non-transitory computer readable medium of claim 14, further comprising instructions that when executed enable the system to send the credential to the at least one enterprise resource for storage in a credential storage of the at least one enterprise resource, wherein responsive to an indication associated with the credential the at least one enterprise resource is to remove the credential at a conclusion of the reservation time.

16. An apparatus comprising:
at least one hardware processor;
at least one non-volatile storage coupled to the at least one hardware processor;
a wireless physical unit to communicate according to at least one wireless protocol;
a reservation handling logic to receive a user request to reserve an enterprise device for a time period and to generate a reservation request to send to an information technology (IT) system that manages the enterprise device and to receive from the IT system, responsive to the reservation request, a credential package including a credential for the enterprise device, the enterprise device comprising a display;
an access control logic coupled to the reservation handling logic to implement a wireless connection protocol with the enterprise device using the credential in a manner transparent to a user of the apparatus and without involvement of the user; and
a display control logic coupled to the access control logic, wherein, after a wireless connection is established with the enterprise device responsive to the wireless connection protocol, the display control logic is to wirelessly communicate display control signals to the enterprise device via the access control logic to enable a user interface of a file accessible to the apparatus to be displayed on the display of the enterprise device.

17. The apparatus of claim 16, wherein the reservation handling logic is to receive the credential package at a time proximate to the time period.

18. The apparatus of claim 17, wherein the reservation handling logic is to store the credential in a storage of the apparatus, and after the time period, to delete the credential.

19. The apparatus of claim 16, wherein the wireless connection protocol comprises a wireless protected setup protocol without user interaction with the apparatus or the enterprise device.

20. The apparatus of claim 16, wherein the apparatus comprises a mobile device of the user and the enterprise device comprises a display system present in a conference room reserved by the IT system.

* * * * *